US012603795B2

(12) United States Patent     (10) Patent No.:   US 12,603,795 B2

Tokunaga et al.     (45) Date of Patent:    Apr. 14, 2026

(54) INFORMATION PROCESSING TERMINAL, INFORMATION PROCESSING DEVICE, AND SYSTEM

(71) Applicant: Sony Group Corporation, Tokyo (JP)

(72) Inventors: Hiroki Tokunaga, Kanagawa (JP); Kengo Uchida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 94 days.

(21) Appl. No.: 18/292,960

(22) PCT Filed: Feb. 22, 2022

(86) PCT No.: PCT/JP2022/007276

§ 371 (c)(1),
(2) Date: Jan. 29, 2024

(87) PCT Pub. No.: WO2023/013117

PCT Pub. Date: Feb. 9, 2023

(65) Prior Publication Data

US 2024/0364559 A1     Oct. 31, 2024

(30) Foreign Application Priority Data

Aug. 5, 2021    (JP) ................................. 2021-128812

(51) Int. Cl.
*H04L 12/28*      (2006.01)
*G06F 1/16*      (2006.01)
        (Continued)

(52) U.S. Cl.
CPC ............ *H04L 12/282* (2013.01); *G06F 1/163* (2013.01); *H04N 23/56* (2023.01); *H04N 23/661* (2023.01)

(58) Field of Classification Search
CPC ......... H04L 12/282; G06F 1/163; G06F 3/01; H04N 23/56; H04N 23/661; H04N 23/60; G06T 1/00
See application file for complete search history.

(56) References Cited

U.S. PATENT DOCUMENTS

2014/0140587 A1*   5/2014   Ballard .................. G06F 21/32
                                    382/124
2016/0029896 A1*   2/2016   Lee ...................... A61B 5/7221
                                    600/474

(Continued)

FOREIGN PATENT DOCUMENTS

JP      2016-209232 A    12/2016
JP      2017-045346 A    3/2017

(Continued)

*Primary Examiner* — Brian J. Gillis
*Assistant Examiner* — Juan C Turriate Gastulo
(74) *Attorney, Agent, or Firm* — Paratus Law Group, PLLC

(57)          ABSTRACT

There is provided an information processing terminal, an information processing device, and a system capable of enhancing convenience of user operation. The information processing terminal includes an imaging unit that images an object in contact with or in proximity to a translucent member via the translucent member, a control unit that controls imaging by the imaging unit, and a communication unit that transmits information based on a captured image obtained by the imaging unit to an external device, in which the imaging unit includes an imaging element and a lens provided such that a distance from the imaging element varies, and the control unit performs control to obtain a plurality of the captured images having a different distance between the lens and the imaging element.

19 Claims, 7 Drawing Sheets

(51) Int. Cl.
  *H04N 23/56* (2023.01)
  *H04N 23/661* (2023.01)

(56) References Cited

U.S. PATENT DOCUMENTS

| | | | |
|---|---|---|---|
| 2016/0034742 A1* | 2/2016 | Kim | G06F 21/35 |
| | | | 382/124 |
| 2017/0185276 A1* | 6/2017 | Lee | G06F 3/04847 |
| 2023/0196768 A1* | 6/2023 | Choi | G06F 1/3278 |
| | | | 715/740 |
| 2024/0126382 A1* | 4/2024 | Yoo | G06V 40/1365 |

FOREIGN PATENT DOCUMENTS

| | | | |
|---|---|---|---|
| JP | 2017-097574 A | 6/2017 |
| KR | 10-2016-0015785 A | 2/2016 |

* cited by examiner

*FIG. 3*

INFORMATION PROCESSING TERMINAL, INFORMATION PROCESSING DEVICE, AND SYSTEM

CROSS REFERENCE TO PRIOR APPLICATION

This application is a National Stage Patent Application of PCT International Patent Application No. PCT/JP2022/007276 (filed on Feb. 22, 2022) under 35 U.S.C. § 371, which claims priority to Japanese Patent Application No. 2021-128812 (filed on Aug. 5, 2021), which are all hereby incorporated by reference in their entirety.

TECHNICAL FIELD

The present disclosure relates to an information processing terminal, an information processing device, and a system.

BACKGROUND ART

In recent years, the Internet of Things (IoT) of furniture and home appliances has progressed, and many items can be operated via a network. At a time of performing an operation via a network, generally, an operation application installed in advance in a smartphone is invoked, and the operation is performed on an operation screen.

Furthermore, miniaturization of various devices has progressed with recent development of technology, and for example, Patent Document 1 set out below discloses a camera in which an optical system for imaging can be made smaller in size and lighter in weight.

CITATION LIST

Patent Document

Patent Document 1: Japanese Patent Application Laid-Open

SUMMARY OF THE INVENTION

Problems to be Solved by the Invention

However, it has been inconvenient to hold and operate the smartphone by hand each time of the operation, which is made frequently. Furthermore, a physical input switch may be limited in installation cost and location.

Solutions to Problems

According to the present disclosure, there is proposed an information processing terminal including an imaging unit that images an object in contact with or in proximity to a translucent member via the translucent member, a control unit that controls imaging by the imaging unit, and a communication unit that transmits information based on a captured image obtained by the imaging unit to an external device, in which the imaging unit includes an imaging element and a lens provided such that a distance from the imaging element varies, and the control unit performs control to obtain a plurality of the captured images having a different distance between the lens and the imaging element.

According to the present disclosure, there is proposed an information processing device including a control unit that performs control to transmit, to a device via a communication unit, a control signal that instructs execution of one or more corresponding pre-registered functions on the basis of a captured image selected from a plurality of captured images obtained by imaging an object in contact with or in proximity to an imaging unit.

According to the present disclosure, there is proposed a system including an information processing terminal and an information processing device, in which the information processing terminal includes an imaging unit that images an object in contact with or in proximity to a translucent member via the translucent member, a control unit that controls imaging by the imaging unit, and a communication unit that transmits information based on a captured image obtained by the imaging unit to the information processing device, the imaging unit includes an imaging element and a lens provided such that a distance from the imaging element varies, the control unit performs control to obtain a plurality of the captured images having a different distance between the lens and the imaging element, and the information processing device includes a control unit that performs control to transmit, to a device via a communication unit, a control signal that instructs execution of one or more corresponding pre-registered functions on the basis of a captured image selected from the plurality of captured images captured by the imaging unit.

BRIEF DESCRIPTION OF DRAWINGS

FIG. 3 is a diagram for explaining a structure of an imaging unit according to the present embodiment.

MODE FOR CARRYING OUT THE INVENTION

Hereinafter, a preferred embodiment of the present disclosure will be described in detail with reference to the accompanying drawings. Note that, in the present specification and the drawings, components having substantially the same functional configuration are denoted by the same reference sign, and redundant descriptions are omitted.

Furthermore, descriptions will be given in the following order.

1. Overview
2. Configuration example
3. Operation process
   3-1. Registration process
   3-2. Function execution process
4. Variations
5. Supplement <<1. Overview>>

Figure 1:
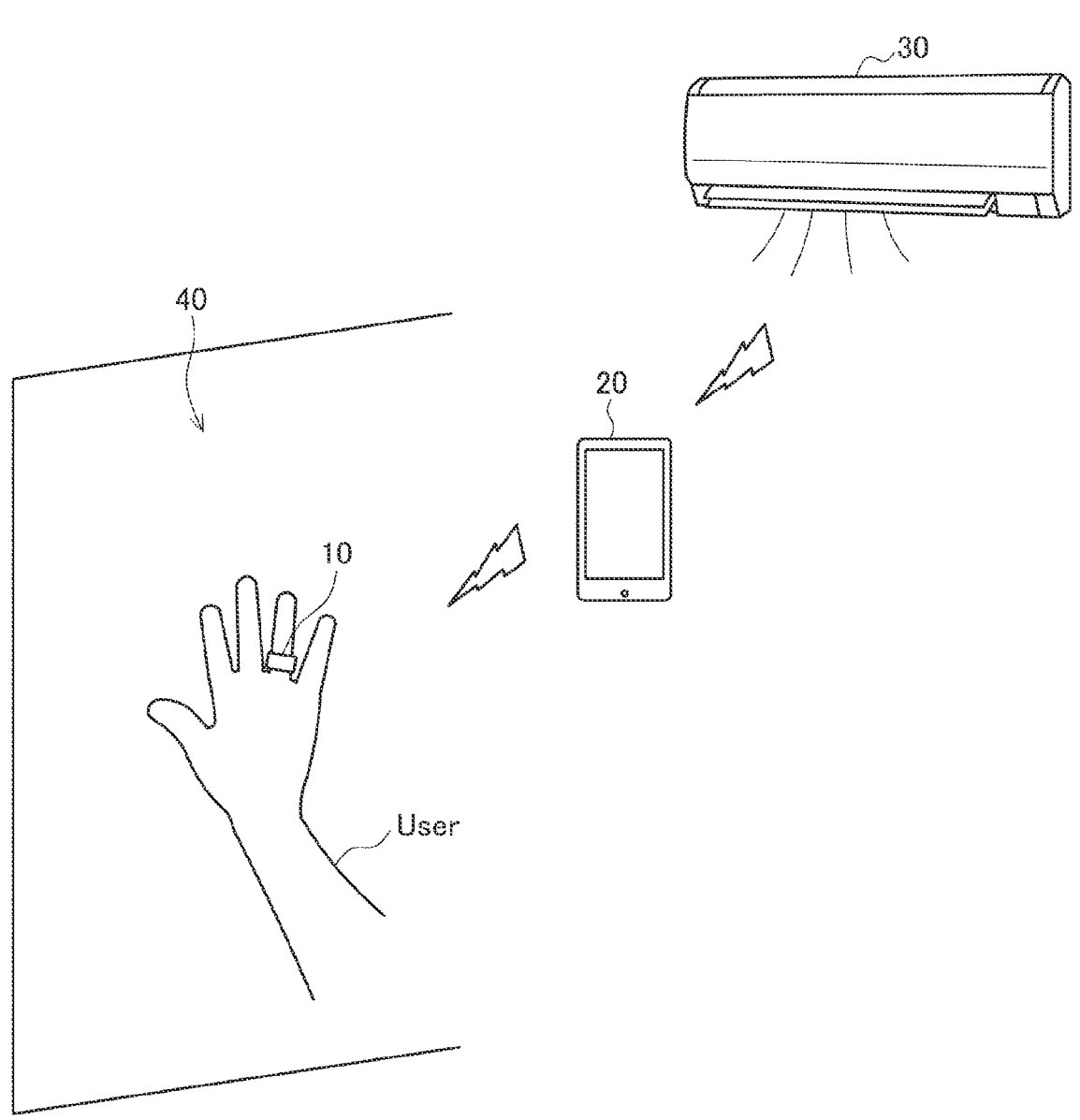
FIG. 1 is a diagram for explaining an outline of an information processing system according to an embodiment of the present disclosure.

FIG. 1 is a diagram for explaining an outline of an information processing system according to an embodiment of the present disclosure. The information processing system according to the present embodiment includes an operation terminal 10 (exemplary information processing terminal) to be used to operate an IoT device 30, and an information processing device 20 that controls the IoT device 30 in accordance with an instruction from the operation terminal 10. The information processing device 20 may be a personal communication device such as a tablet terminal, a personal computer (PC), or the like, in addition to a smartphone as illustrated in FIG. 1. Furthermore, the information processing device 20 may be a dedicated terminal communicably connected to a large number of IoT devices 30 to mediate communication between the operation terminal 10 and the IoT devices 30. The IoT device 30 is an exemplary device to be operated by the operation terminal 10. Examples of the IoT device 30 include furniture and home appliances. A user may operate (turn on/off, etc.) the IoT device 30 using the operation terminal 10 worn on a finger or the like.

(Review of Problems)

As described above, while the IoT of furniture and home appliances has progressed and many items can be operated via a network, it has been inconvenient to take a smartphone in hand each time of an operation, which is made frequently, to unlock (fingerprint authentication or passcode input) the smartphone, and to further start an operation application for making the operation. Furthermore, while it is conceivable to assign the operation of the IoT device to a physical input button, installation cost increases if the input button is increased each time the number of functions to be assigned increases. Furthermore, the increased number of input buttons may impair the design of the installation site.

In view of the above, in the present embodiment, the operation of the IoT device is assigned to surrounding objects. Specifically, a system is provided in which object recognition is carried out using a camera and the operation of the IoT device assigned to the recognized object is executed. By recognizing the object around the user with the camera, the user is enabled to operate the IoT device without considering the smartphone operation or the installation site of the input button, which further enhance the convenience of the IoT device.

A device (operation terminal) equipped with a camera is preferably a wearable device that is further downsized and may be worn on a finger, wrist, or the like of the user. With this arrangement, the user is enabled to use the operation terminal without being bothered by the operation that frequently occurs. Furthermore, the operation terminal may be a smartphone. By performing object recognition with a camera provided in the smartphone and automatically operating the assigned IoT device, it becomes possible to reduce botheration without causing the user to unlock the smartphone or to make a screen operation.

The operation terminal according to the present embodiment may be the operation terminal 10, which is in a ring form, to be worn on a finger of the user as illustrated in FIG. 1, for example. The user brings the operation terminal 10 provided with an imaging unit into contact with an object 40 (e.g., room wall) to which an on/off operation of the IoT device 30 to be operated is assigned. At this time, the surface (wall surface) of the object 40 is imaged by the operation terminal 10, and a captured image is transmitted to the information processing device 20. The information processing device 20 carries out object recognition on the basis of the captured image, and when it determines that the object is the object 40 to which the on/off operation of the IoT device 30 is assigned, transmits an instruction of the on/off operation to the IoT device 30.

Note that, according to the present embodiment, possibility of privacy invasion caused by the use of the camera for the object recognition may be reduced by using the imaging unit having a short focal length. Furthermore, while the focus may be shifted (out of focus, i.e., blurred) when imaging is carried out with a single focal point due to the variety of the texture of the object surface, the imaging unit is made larger and heavier if an autofocus mechanism is mounted. The imaging unit according to the present embodiment has a structure that carries out imaging multiple times by changing a distance between the lens and the imaging element when the operation terminal 10 comes into contact with an object. With this arrangement, it becomes possible to obtain a captured image in focus (hereinafter also referred to as focused image). Details of the structure will be described later with reference to FIG. 3.

The outline of the information processing system according to an embodiment of the present disclosure has been described above. Next, specific configurations of the operation terminal 10 and the information processing device 20 included in the information processing system according to the present embodiment will be described with reference to the drawings.

<<2. Configuration Example>>

Figure 2:
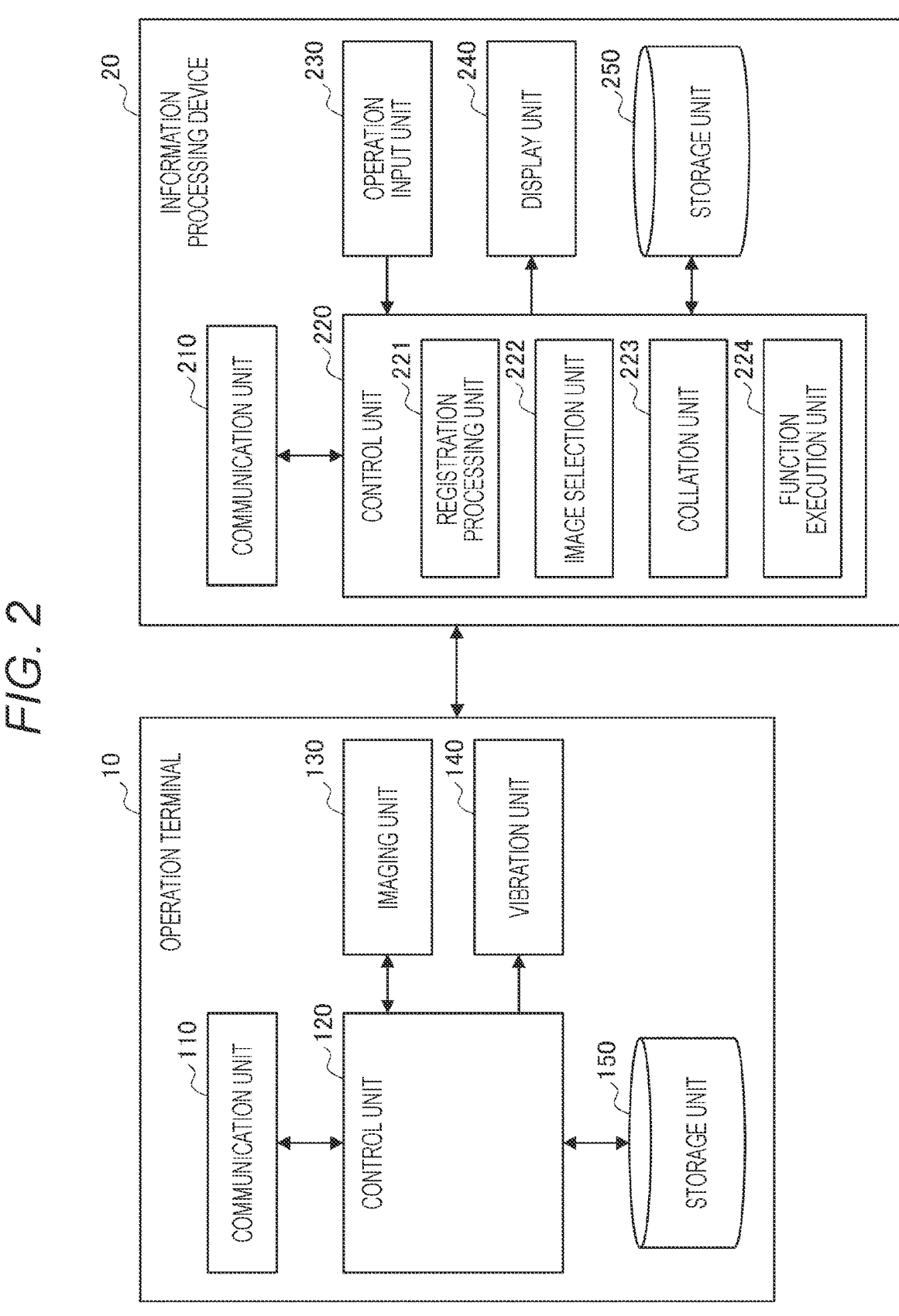
FIG. 2 is a block diagram illustrating a configuration example of each device included in the information processing system according to the present embodiment.

FIG. 2 is a block diagram illustrating a configuration example of each device included in the information processing system according to the present embodiment.

<2-1. Operation Terminal 10>

As illustrated in FIG. 2, the operation terminal 10 includes a communication unit 110, a control unit 120, an imaging unit 130, a vibration unit 140, and a storage unit 150.

(Communication Unit 110)

The communication unit 110 is communicably connected to an external device, and transmits and receives data. For example, the communication unit 110 may be communicably connected to the information processing device 20 by wireless communication such as Wi-Fi (registered trademark), Bluetooth (registered trademark), or the like.

(Control Unit 120)

The control unit 120 functions as an arithmetic processing device and a control device, and controls the overall operation in the operation terminal 10 according to various programs. The control unit 120 is implemented by, for example, an electronic circuit such as a central processing unit (CPU), a microprocessor, or the like. Furthermore, the control unit 120 may include a read only memory (ROM) that stores programs, operation parameters, and the like to be used, and a random access memory (RAM) that temporarily stores parameters and the like that change as appropriate.

The control unit 120 according to the present embodiment controls imaging by the imaging unit 130. Furthermore, the control unit 120 performs control to transmit one or more captured images obtained by the imaging unit 130 from the communication unit 110 to the information processing device 20.

(Imaging Unit 130)

The imaging unit 130 has a function of imaging a subject. More specifically, the imaging unit 130 according to the present embodiment has a short focal length, and may extract information from an ultra-narrow region of the object surface. Furthermore, the imaging unit 130 according to the present embodiment is implemented by a structure that carries out imaging multiple times by changing the distance between the lens and the imaging element included in the imaging unit 130. Since the texture of the object surface varies and the appropriate focal length differs depending on the object, imaging is carried out multiple times by changing the distance between the lens and the imaging element to increase the possibility of obtaining an image in focus. Here, the structure of the imaging unit 130 according to the present embodiment will be specifically described with reference to FIG. 3.

Figure 3:
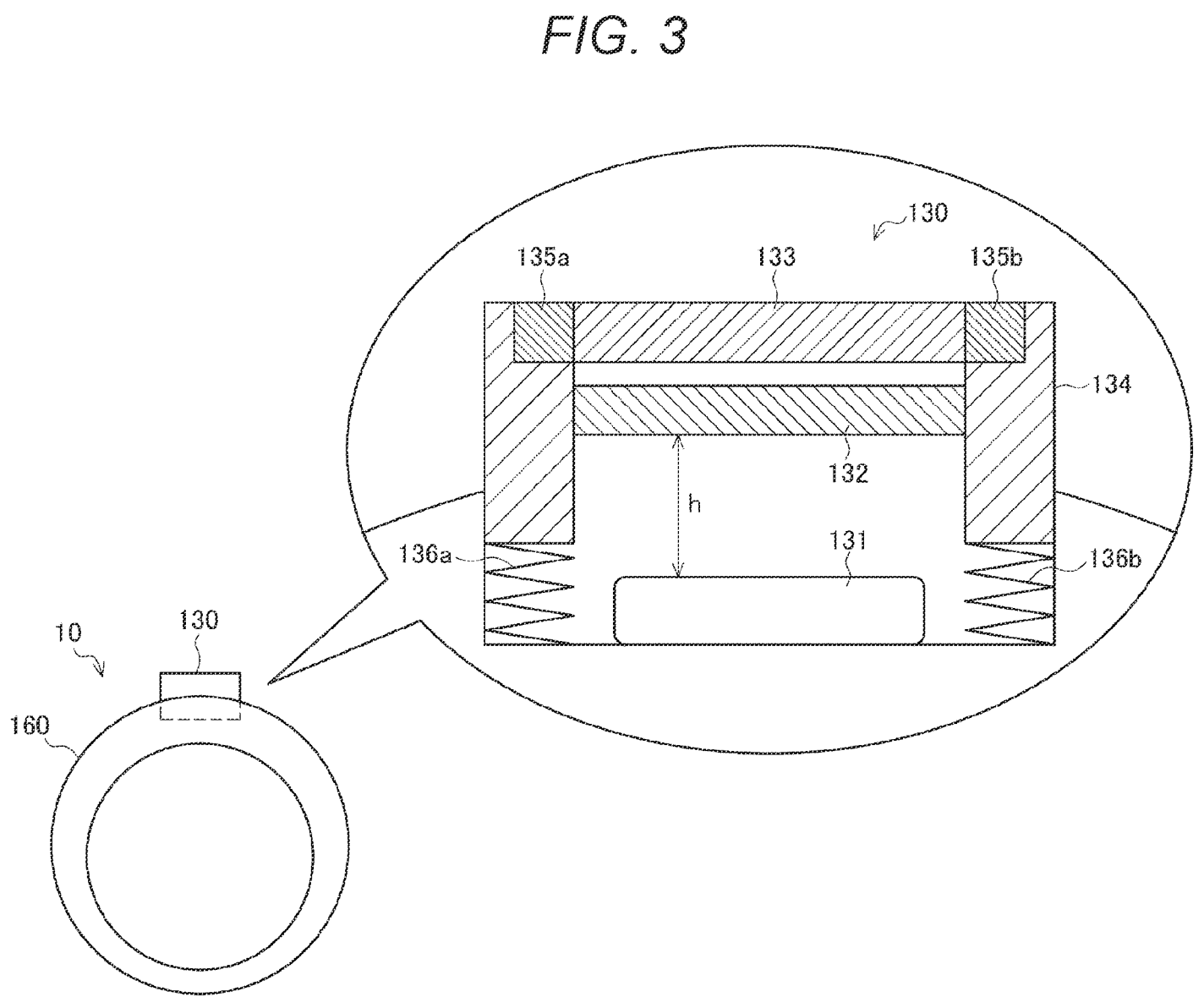

FIG. 3 is a diagram for explaining the structure of the imaging unit 130 according to the present embodiment. As illustrated in FIG. 3, the operation terminal 10 according to the present embodiment includes a ring-shaped (ring form) main body 160 that may be worn on a finger, for example. Furthermore, as illustrated in FIG. 3, the imaging unit 130 provided in the main body 160 includes an imaging element 131, a lens 132, a light guide plate 133, a light source unit 135 (135a and 135b), a movable member 134, and a return spring 136.

The imaging element 131 images an object (subject) in contact with or in proximity to the light guide plate 133 via the light guide plate 133. Note that the proximity is included in the contact and described in the present specification. The lens 132 is provided such that a distance h to the imaging element 131 varies. Specifically, the movable member 134 to which the lens 132 is fixed is pushed in the direction toward the imaging element 131 by contact with an object, whereby the distance h between the imaging element 131 and the lens 132 varies. The light guide plate 133 is provided to cover the lens 132 at the distal end of the movable member 134, that is, on the side opposite to the imaging element 131 with respect to the lens 132. When the movable member 134 comes into contact with an object, such as a room wall, and the movable member 134 is pushed in the direction toward the imaging element 131, the distance h between the imaging element 131 and the lens 132 is shortened. The return spring 136 has a function of pushing back the movable member 134, which is pushed in the direction toward the imaging element 131, in the direction toward the light guide plate 133. While the return spring 136 is used as an example here, it is sufficient if the function of pushing back the movable member 134 is provided. Furthermore, the light guide plate 133 is an exemplary translucent member. The light source unit 135 (135a and 135b) is provided at both ends of the light guide plate 133. Note that the position of the light source unit 135 is not limited to the example illustrated in FIG. 3. The light source unit 135 may be arranged around the light guide plate 133, for example, on the lower side of the light guide plate 133 (side on which the imaging element 131 is located).

The control unit 120 performs control to obtain multiple captured images each having a different distance h between the lens 132 and the imaging element 131. Hereinafter, descriptions will be given with reference to FIG. 4.

Figure 4:
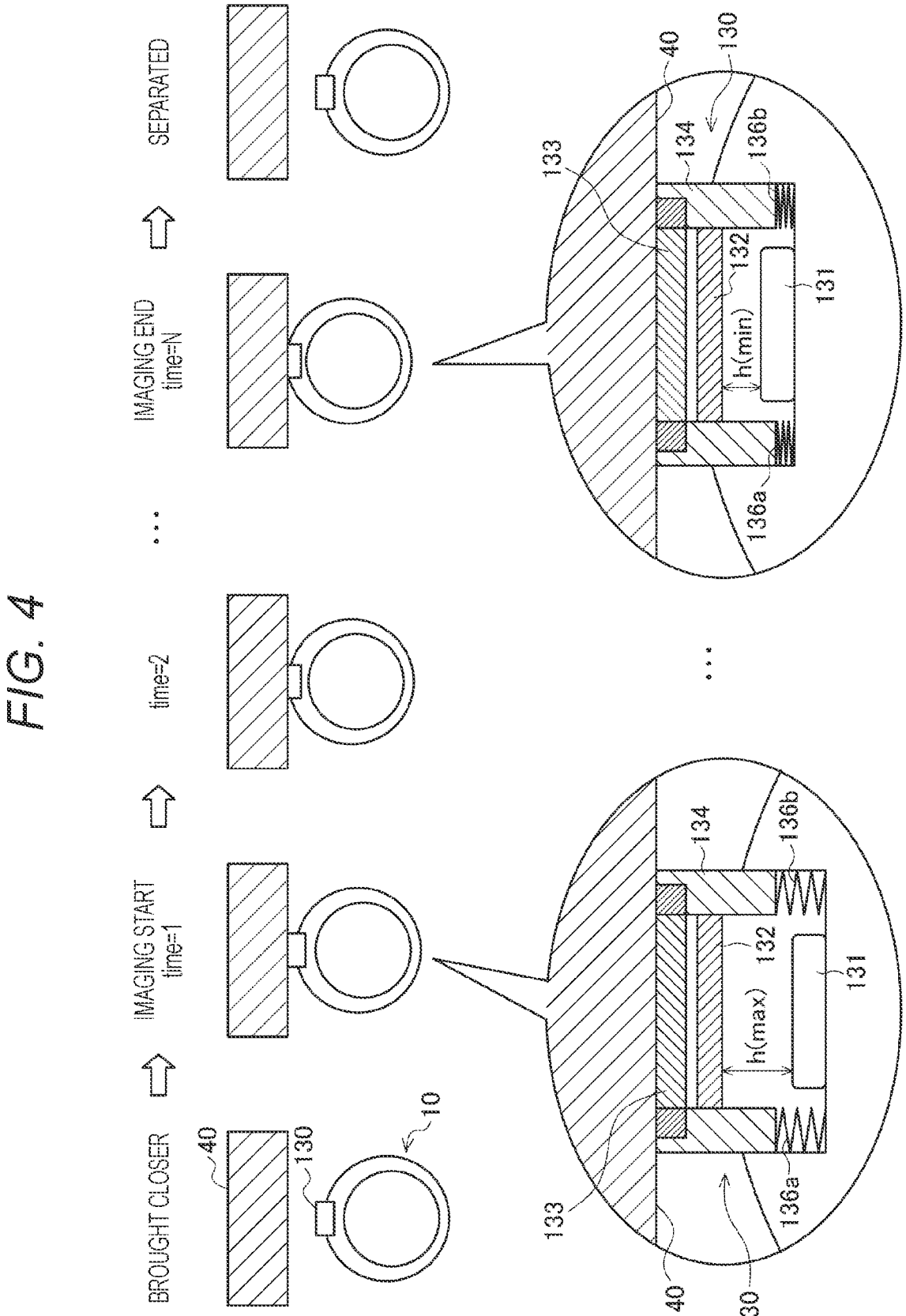
FIG. 4 is a diagram for explaining imaging according to the present embodiment.

FIG. 4 is a diagram for explaining the imaging according to the present embodiment. As illustrated in FIG. 4, first, the user brings the operation terminal 10 worn on a finger or the like close to the object 40. When the operation terminal 10 comes into contact with the object 40, the control unit 120 turns on the light source unit 135, and performs control to start imaging by the imaging unit 130. The contact with the object 40 may be determined by, for example, detecting the pushing of the movable member 134. The movable member 134 may be pushed by the force received when the light guide plate 133 comes into contact with the object 40. As a method of the push detection, for example, an operation method such as a momentary type may be used, or a conduction system such as a resistance film may be used.

Although illustration is omitted in FIG. 4, such a detection unit may be provided in the imaging unit 130.

As illustrated in FIG. 4, it can be said that the distance h between the lens 132 and the imaging element 131 is the longest distance (h_max) at the start of the imaging. The control unit 120 continuously carries out the imaging until the pushing ends (until the movable member 134 is pushed to the end). At this time, it can be said that the distance h between the lens 132 and the imaging element 131 is the shortest distance (h_min), as illustrated in FIG. 4. Whether or not it has been pushed to the end may be detected by the detection unit provided in the return spring 136, or may be detected by the detection unit provided around the movable member 134. The detection unit may be, for example, a contact sensor, an optical sensor, a pressure sensor, or the like.

In this manner, in the imaging unit 130 according to the present embodiment, the distance h between the lens 132 and the imaging element 131 is changed using the force at the time of object contact, and multiple captured images each having a different distance h are obtained. Furthermore, a lens drive mechanism is removed, whereby the imaging unit 130 according to the present embodiment may be downsized.

In the present embodiment, for example, a captured image in focus may be selected from multiple captured images each having a different distance h, and object recognition may be carried out in the information processing device 20 to be described later. Here, a difference in focal length at the time of imaging an object will be described with reference to FIGS. 5 and 6.

Figure 5:
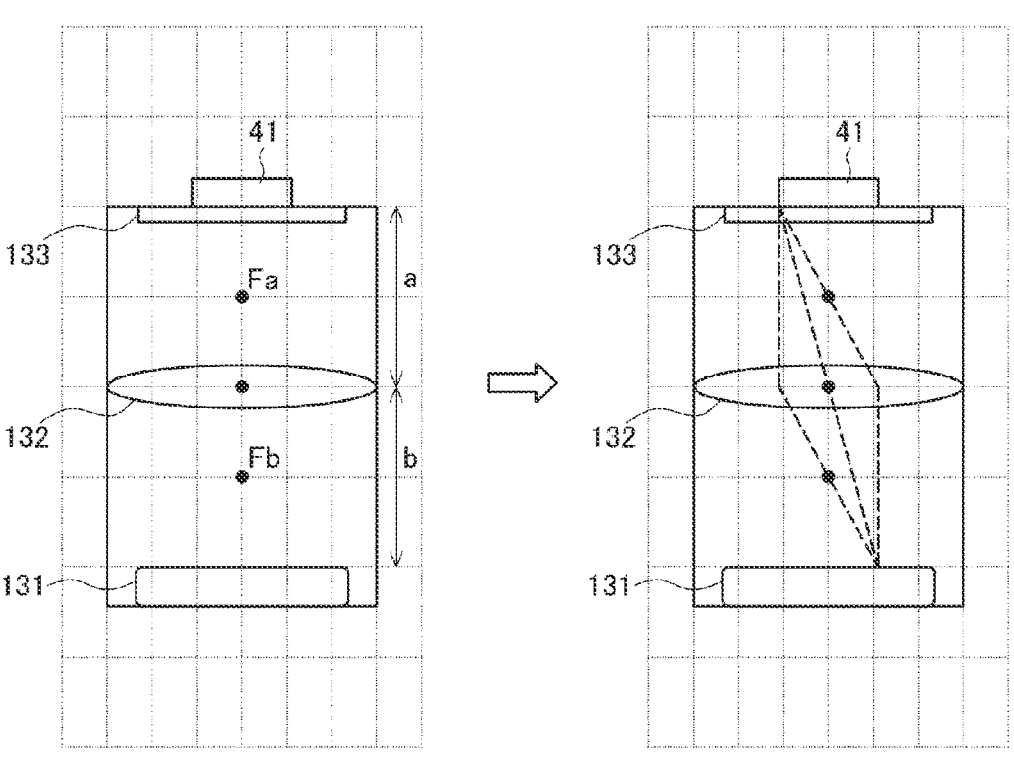
FIG. 5 is a schematic diagram for explaining imaging of an object having a planar texture according to the present embodiment.

FIG. 5 is a schematic diagram for explaining imaging of an object 41 having a planar texture according to the present embodiment. In a case where the imaging element 131, the lens 132, and the light guide plate 133 are arranged at distance intervals as illustrated on the left side of FIG. 5, the object 41 having a planar texture may constantly obtain a captured image in focus, as illustrated on the right side of FIG. 5. Since a distance a between the lens 132 and the object 41 is twice a distance between the lens 132 and a focal point Fa in the arrangement illustrated in FIG. 5, if the imaging element 131 is positioned at a distance b from the lens 132 (twice the distance between the lens 132 and a focal point Fb), a captured image in focus by the imaging element 131 may be obtained.

On the other hand, in a case of an object 42 having a three-dimensional texture, there is a portion having a different depth of field, whereby a portion out of focus is generated in a case of single focus. On the other hand, according to the present embodiment, the distance between the lens 132 and the imaging element 131 varies, which enables acquisition of surface information of an object with depth (acquisition accuracy enhancement). Hereinafter, descriptions will be given with reference to FIG. 6.

Figure 6:
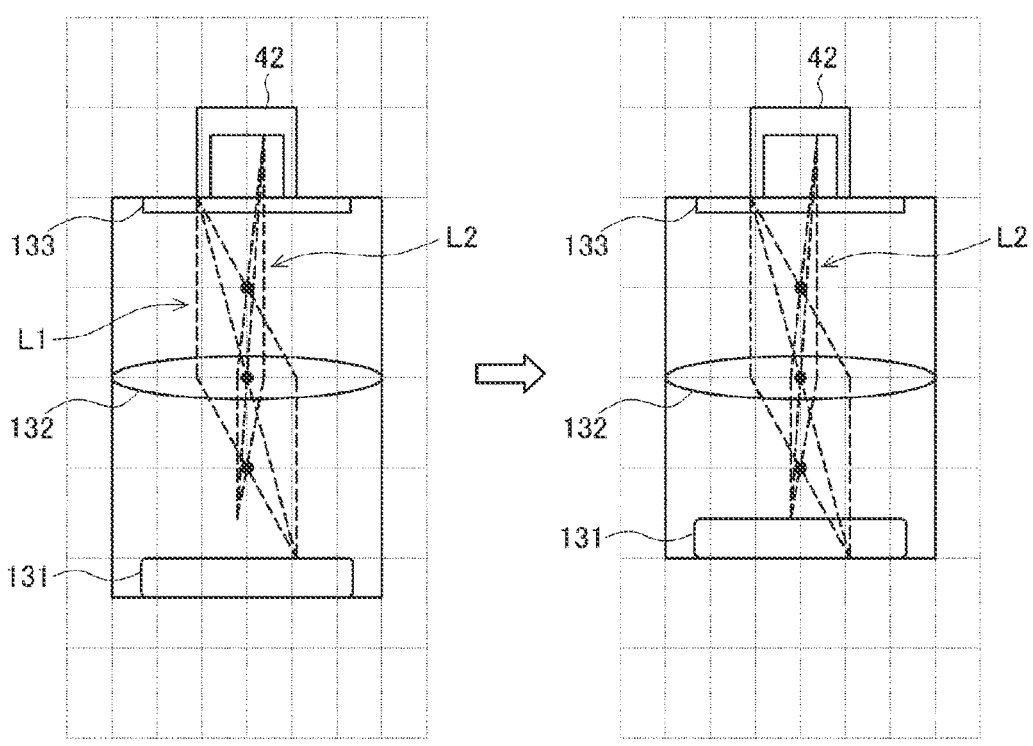
FIG. 6 is a schematic diagram for explaining imaging of an object having a three-dimensional texture according to the present embodiment.

FIG. 6 is a schematic diagram for explaining imaging of the object 42 having a three-dimensional texture according to the present embodiment. In the case of the arrangement illustrated on the left side of FIG. 6, a light beam L1 is in focus, whereas a light beam L2 in a depth portion is out of focus. Since the distance between the lens 132 and the imaging element 131 varies in the present embodiment, for example, the light beam L2 is focused by changing to the arrangement illustrated on the right side of FIG. 6, which enables acquisition of the surface information of the object with depth. As described above, the imaging method according to the present embodiment may be said to be particularly useful for an object having a three-dimensional texture.

Since multiple captured images each having a different distance between the lens 132 and the imaging element 131 are obtained in the present embodiment, the captured image with the focal point illustrated on the left side of FIG. 6 and the captured image with the focal point illustrated on the right side of FIG. 6 may be obtained. In this case, for example, the information processing device 20 selects the captured image with the focal point illustrated on the right side of FIG. 6, and carries out object recognition. In the object recognition, a feature amount of an object surface is extracted as surface information of the object. Then, the information processing device 20 compares the extracted feature amount with a feature amount registered in advance, and executes the associated function (operation of the IoT device 30, etc.).

(Vibration Unit 140)

The vibration unit 140 has a function of presenting a tactile stimulus under the control of the control unit 120. The structure of the vibration unit 140 is not particularly limited. Furthermore, a mounting position of the vibration unit 140 is not particularly limited. The control unit 120 performs control to present vibration when the movable member 134 is pushed to the end, for example. With this arrangement, it becomes possible to give operation feedback (what is called click feeling) to the user.

(Storage Unit 150)

The storage unit 150 is implemented by a read only memory (ROM) that stores programs, operation parameters, and the like to be used for processing of the control unit 120, and a random access memory (RAM) that temporarily stores parameters and the like that change as appropriate.

The configuration of the operation terminal 10 has been specifically described above. Note that the configuration of the operation terminal 10 according to the present embodiment is an example, and the present disclosure is not limited thereto. For example, the operation terminal 10 may not include the vibration unit 140. The operation terminal 10 may have, instead of the vibration unit 140, a physical structure capable of presenting click feeling when the movable member 134 is pushed to the end. Furthermore, the operation terminal 10 according to the present embodiment may perform, not limited to feedback by vibration, feedback by light or sound. That is, the vibration unit 140 is an exemplary presentation unit that presents feedback, and the operation terminal 10 may include a light emission unit or an audio output unit. Furthermore, the operation terminal 10 is not limited to the ring form, and may be formed by a bangle-type or bracelet-type main body 160 to be worn on the wrist of the user. Furthermore, the operation terminal 10 may be a pendant top.

<2-2. Information Processing Device 20>

As illustrated in FIG. 2, the information processing device 20 includes a communication unit 210, a control unit 220, an operation input unit 230, a display unit 240, and a storage unit 250.

(Communication Unit 210)

The communication unit 210 is communicably connected to an external device, and transmits and receives data. For example, the communication unit 210 transmits and receives data to and from the operation terminal 10 and the IoT device 30. Furthermore, the communication unit 210 may be communicably connected to the operation terminal 10 and the IoT device 30 via a home network. The communication unit 210 may be communicably connected to a network by, for example, a wired/wireless local area network (LAN), Wi-Fi (registered trademark), Bluetooth (registered trademark), a mobile communication network (long term evolution (LTE), third generation mobile communication system (3G), fourth generation mobile communication system (4G), and fifth generation mobile communication system (5G)), or the like.

(Control Unit 220)

The control unit 220 functions as an arithmetic processing device and a control device, and controls the overall operation in the information processing device 20 according to various programs. The control unit 220 is implemented by, for example, an electronic circuit such as a central processing unit (CPU), a microprocessor, or the like. Furthermore, the control unit 220 may include a read only memory (ROM) that stores programs, operation parameters, and the like to be used, and a random access memory (RAM) that temporarily stores parameters and the like that change as appropriate.

The control unit 220 according to the present embodiment may also function as a registration processing unit 221, an image selection unit 222, a collation unit 223, and a function execution unit 224. The registration processing unit 221 performs registration process of a function to be assigned to an object. Specifically, the registration processing unit 221 performs a process of storing, in the storage unit 250, a feature amount of an object extracted from a captured image, a place name of the object (wall next to staircase, etc.), and a function to be assigned in association with each other as registration information. The feature amount of the object is obtained by analyzing the image selected from multiple captured images captured by the operation terminal 10 at the time of registration. Note that the registration information may be stored in a cloud server (not illustrated). The function to be assigned is, for example, an on/off operation of the IoT device 30. The registration of the feature amount and the place name of the object and the registration of the function to be assigned may be performed at different timings. Furthermore, the function to be assigned may be changed. A more specific flow of the registration process will be described later with reference to FIG. 7.

The image selection unit 222 selects a captured image in focus (focused image) from multiple captured images transmitted from the operation terminal 10. The image selection unit 222 outputs the selected captured image to the collation unit 223.

The collation unit 223 analyzes the captured image to extract the feature amount (more specifically, feature amount of the object surface) of the object (subject), collates it with the registration information, and invokes the corresponding function. The texture of the object surface varies, and a minute change between objects may be captured if information is extracted from an ultra-narrow region of the object surface with high spatial resolution.

The function execution unit 224 performs control to execute the function invoked by the collation unit 223. For example, the function execution unit 224 performs control to transmit a control signal instructing on/off of the IoT device 30 to the IoT device 30 via the home network. The IoT device 30 that has received the control signal operates to transition to the off state if it is in the on state, and to transition to the on state if it is in the off state.

(Operation Input Unit 230)

The operation input unit 230 receives an operation from the user, and outputs input information to the control unit 220. The operation input unit 230 is implemented by, for example, various input devices such as a touch panel, a button, a switch, a keyboard, and the like.

(Display Unit 240)

The display unit 240 has a function of displaying various screens such as an operation screen. The display unit 240 may be implemented by, for example, a liquid crystal display (LCD) device, an organic light emitting diode (OLED) device, or the like. Furthermore, the display unit 240 may be what is called an optical see-through display having optical transparency, or may be a projector that projects an image on a real space.

(Storage Unit 250)

The storage unit 250 is implemented by a read only memory (ROM) that stores programs, operation parameters, and the like to be used for processing of the control unit 220, and a random access memory (RAM) that temporarily stores parameters and the like that change as appropriate.

The configuration of the information processing device 20 has been specifically described above. Note that the configuration of the information processing device 20 according to the present embodiment is not limited to the example illustrated in FIG. 2. For example, the information processing device 20 may be implemented by a plurality of devices. Furthermore, at least a part of the function of the control unit 220 may be implemented by the operation terminal 10 or a server (not illustrated) on the network. For example, the function of the image selection unit 222 may be implemented by the control unit 120 of the operation terminal 10. In this case, the operation terminal 10 performs control to transmit the captured image in focus selected from the plurality of captured images to the information processing device 20.

<<3. Operation Process>>

Next, an operation process of the information processing system according to the present embodiment will be specifically described with reference to the drawings.

<3-1. Registration Process>

Figure 7:
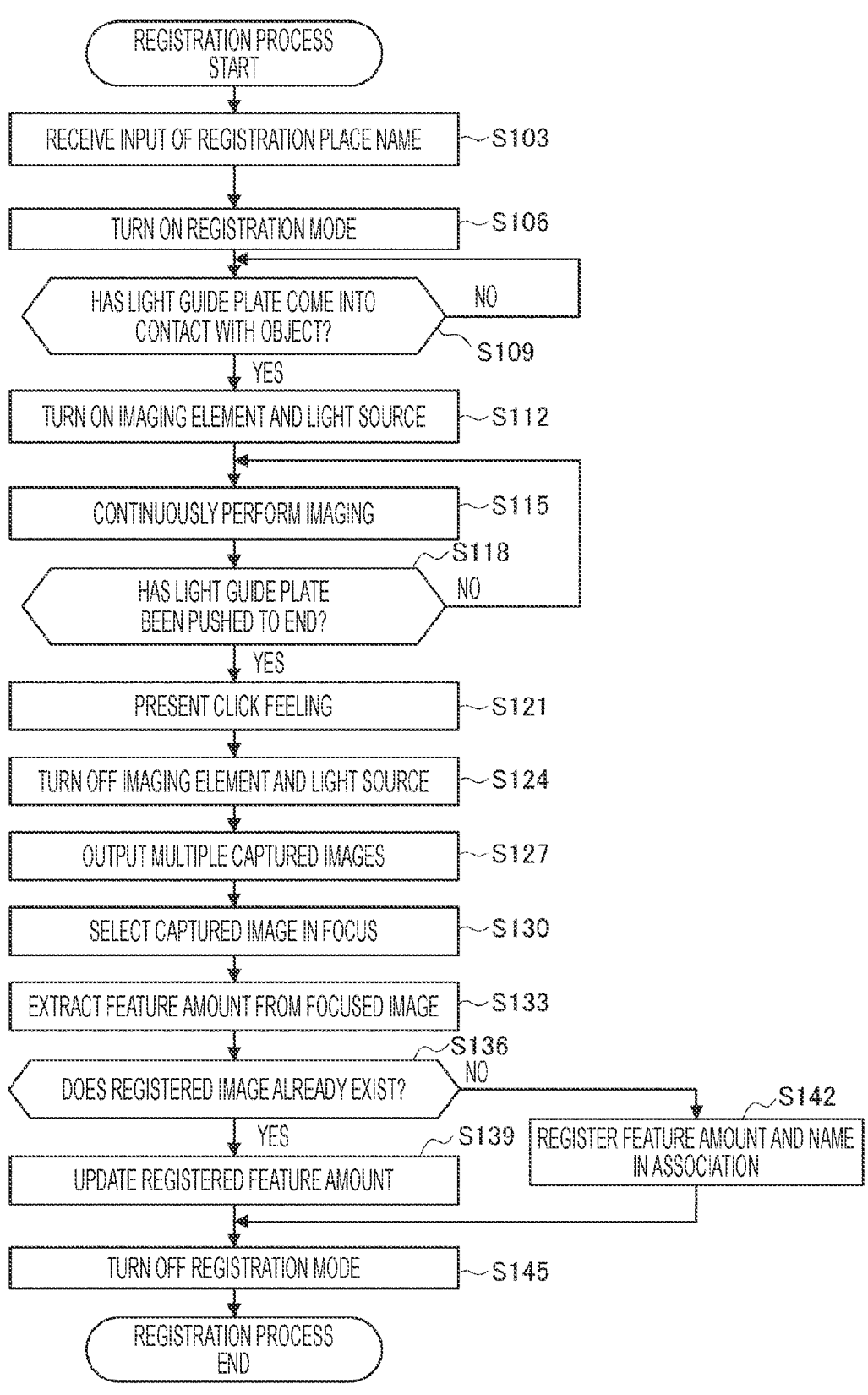
FIG. 7 is a flowchart illustrating an exemplary flow of a registration process according to the present embodiment.

FIG. 7 is a flowchart illustrating an exemplary flow of the registration process according to the present embodiment. The registration process illustrated in FIG. 7 may be executed by the information processing device 20 and the operation terminal 10 as an example.

As illustrated in FIG. 7, first, the information processing device 20 receives an input of a name of a registration place made by the user from the operation input unit 230 (step S103). For example, the user may input, as an object place name to be registered, a name such as "living room wall", "entrance ornament", or the like. The name to be input may be optionally input by the user, or may be selected by the user from names prepared in advance.

Next, the control unit 220 of the information processing device 20 shifts the operation mode to the registration mode on, and stands by for acquisition of a captured image (step S106).

Next, the control unit 120 of the operation terminal 10 determines whether or not the light guide plate 133 has come into contact with the object (step S109).

In a case where it has come into contact with the object (Yes in step S109), the control unit 120 performs control to turn on the imaging element 131 and the light source unit 135 (step S112). That is, the control unit 120 performs control to turn on the light source unit 135 and start imaging by the imaging unit 130.

Next, the control unit 120 continuously performs imaging while the movable member 134 is pushed using the force at the time of object contact and the distance h between the lens 132 and the imaging element 131 changes (step S115). The number of times of the imaging may be determined by the performance (frames per second (FPS)) of the imaging unit 130, or may be determined by the control unit 120 according to a contact time with the object set by the user (length of time during which the operation terminal 10 is in contact with the object. A natural length as UI is preferable), or an erroneous authentication rate. For example, in a case where the erroneous authentication rate (rate at which no function is invoked or an incorrect function is invoked when authentication is performed) of approximately 5% is a value serving as a guide of a natural UI, it may be set to a value higher than 5% as long as malfunction of the function to be assigned can be tolerated to some extent, or may be set to a value lower than 5% as long as malfunction of the function to be assigned is not very tolerated. At the time of lowering the erroneous authentication rate, a larger number of times of imaging is set. The possibility that the focused image is included increases as the number of captured images increases, which may improve the authentication accuracy (i.e., accuracy of collation by the collation unit 223 at the time of function execution). On the other hand, it takes time to transfer and select the target captured image, whereby it may take time to execute the function. It is also possible to shorten the time until the execution of the function by reducing the number of times of imaging.

Next, the control unit 120 determines whether or not the light guide plate 133 (provided on the movable member 134) has been pushed to the end (step S118).

In a case where it has been pushed to the end (Yes in step S118), the control unit 120 controls the vibration unit 140 to present click feeling (step S121). The user recognizes that it has been pushed to the end by the click feeling, and releases the operation terminal 10 from the object.

Next, the control unit 120 performs control to turn off the imaging element 131 and the light source unit 135 (step S124).

Next, the control unit 120 outputs multiple captured images to the information processing device 20 (step S127).

Subsequently, the image selection unit 222 of the information processing device 20 selects a captured image in focus (focused image) from the multiple captured images (step S130). In the case of a three-dimensional texture, for example, a captured image having the largest focused area may be selected.

Next, the collation unit 223 performs image analysis on the focused image selected by the image selection unit 222, and extracts a feature amount of the object surface (step S133). Note that, in a case where the feature amount exceeding a certain criterion cannot be extracted, the registration processing unit 221 may determine that the registration has failed. At this time, the information processing device 20 notifies the user of the failure of the registration. The notification may be made by, for example, the display unit 240, or may be made by voice.

Next, in a case where a registered image already exists (Yes in step S136), the registration processing unit 221 updates the feature amount (registered feature amount) associated with the registered image (step S139). The registered image is a captured image already registered in the storage unit 150 or the like as registration information. The registration processing unit 221 searches for the already registered captured image (or feature amount) from the input name and the selected focused image, and registers the latest feature amount in a case where it exists.

On the other hand, in a case where the registered image does not yet exist (No in step S136), the registration processing unit 221 registers the feature amount and the name (information indicating where the object is located) in association with each other (step S142). The registration processing unit 221 may also register the selected focused image. Furthermore, at this time, the user may also register the function to be assigned to the object. Specifically, for example, any IoT device is selected from a large number of IoT devices connected to the home network, and a predetermined operation of the IoT device is assigned as a function.

Then, the control unit 220 turns off the registration mode (step S145).

The exemplary flow of the process at the time of registration has been described above. Note that the user may register functions to be assigned to individual objects by operating the information processing device 20 after registering various places (objects present at the places) in the house. Furthermore, the user is also enabled to change the function to be assigned to the object as appropriate, which increases a degree of freedom of customization and further improves convenience.

Furthermore, the registration process illustrated in FIG. 7 is an example, and the present disclosure is not limited thereto. For example, the input of the name of the registration place indicated in step S103 is not necessarily performed at the beginning, and may be performed at any timing before step S136, for example. Furthermore, the control unit 220 may not perform the processing indicated in step S136 and step S139. Furthermore, the image selection processing indicated in step S130 may be performed by the operation terminal 10. In this case, the processing indicated in step S127 is not performed, and processing of transmitting the selected captured image to the information processing device 20 is performed after the image selection processing. With this arrangement, it becomes possible to reduce the time required for the image transfer to the information processing device 20.

As described above, according to the present embodiment, it becomes possible to assign a function, such as operation of the IoT device 30, to a nearby object. In a case where it is desired to increase the number of functions to be assigned, it becomes possible to easily increase the number of functions to be assigned by registering the functions in nearby objects (any new places) without concerning about the installation cost, the design of the installation site, and the like of the input buttons for operation or the like.

<3-2. Function Execution Process>

Figure 8:
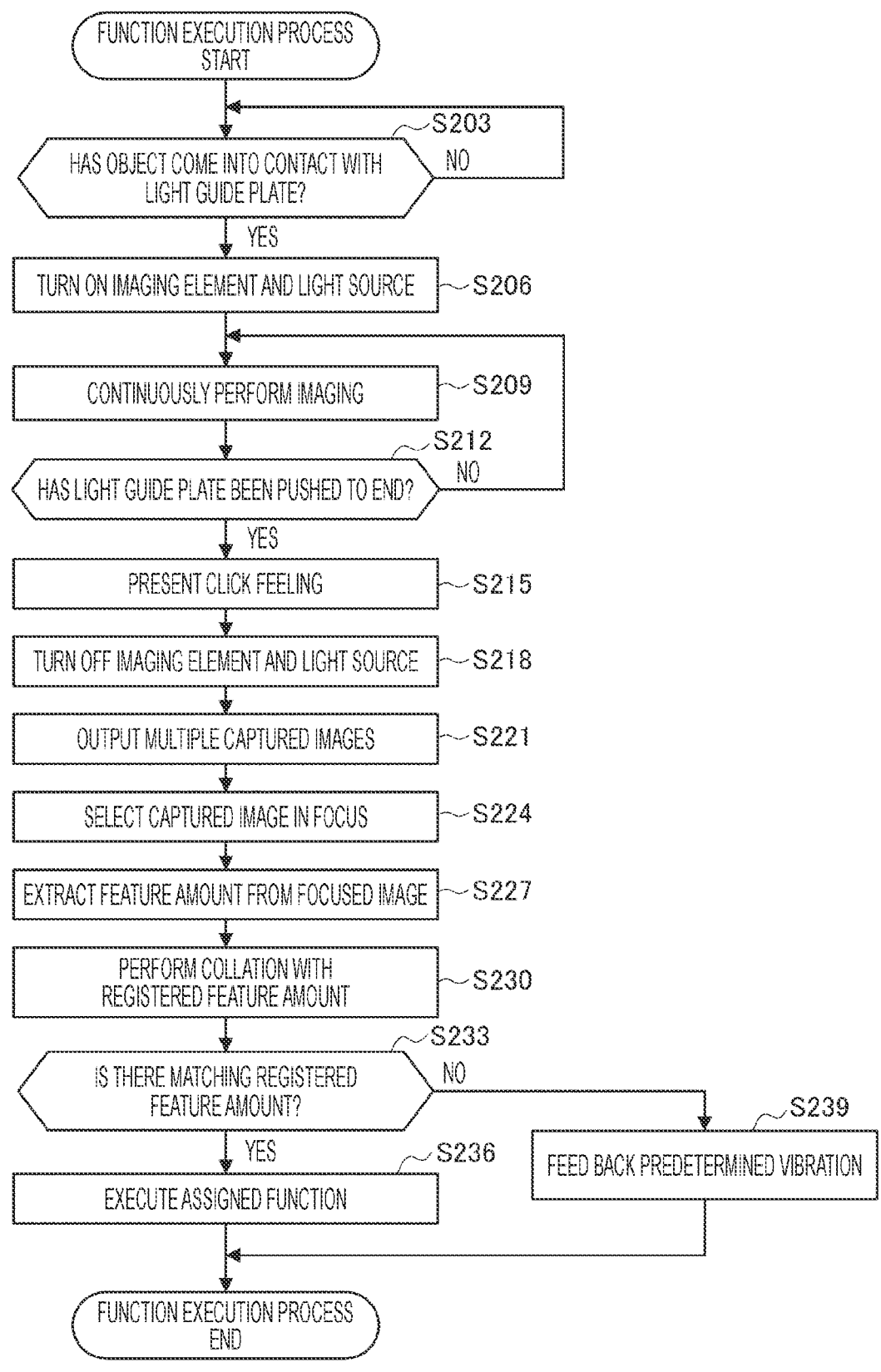
FIG. 8 is a flowchart illustrating an exemplary flow of a function execution process according to the present embodiment.

FIG. 8 is a flowchart illustrating an exemplary flow of a function execution process according to the present embodiment. The function execution process illustrated in FIG. 8 may be executed by the information processing device 20 and the operation terminal 10 as an example.

As illustrated in FIG. 8, first, the control unit 120 of the operation terminal 10 determines whether or not the light guide plate 133 has come into contact with an object (step S203).

In a case where it has come into contact with the object (Yes in step S203), the control unit 120 performs control to turn on the imaging element 131 and the light source unit 135 (step S206).

Next, the control unit 120 continuously performs imaging while the movable member 134 is pushed using the force at the time of object contact and the distance h between the lens 132 and the imaging element 131 changes (step S209).

Next, in a case where the light guide plate 133 (provided on the movable member 134) has been pushed to the end (Yes in step S212), the control unit 120 controls the vibration unit 140 to present click feeling (step S215). The user recognizes that it has been pushed to the end by the click feeling, and releases the operation terminal 10 from the object.

Next, the control unit 120 performs control to turn off the imaging element 131 and the light source unit 135 (step S218).

Next, the control unit 120 outputs multiple captured images to the information processing device 20 (step S221).

Subsequently, the image selection unit 222 of the information processing device 20 selects a captured image in focus (focused image) from the multiple captured images (step S224).

Next, the collation unit 223 performs image analysis on the focused image selected by the image selection unit 222, and extracts a feature amount of the object surface (step S227).

Next, the collation unit 223 collates the extracted feature amount with a registered feature amount (step S230). The registered feature amount indicates a feature amount registered by the registration process described with reference to FIG. 7. The collation unit 223 compares the extracted feature amount with the registered feature amount, and searches for a matching feature amount.

Next, in a case where there is a matching registered feature amount (Yes in step S233), the function execution unit 224 executes the assigned function (step S236).

On the other hand, in a case where there is no matching registered feature amount (No in step S233), the control unit 220 feeds back predetermined vibration to the operation terminal 10 (step S239). The predetermined vibration is vibration for notifying the user of mismatching (non-registration) indicated by the collation result. The control unit 220 transmits a control signal instructing to generate the predetermined vibration to the operation terminal 10. The predetermined vibration may be vibration of a pattern different from that of the vibration for notifying the user of the end of the pushing described above. Since there may be a case where the pushing speed of the operation terminal 10 is too fast to obtain a sufficient captured image or to avoid blurring, the user may bring the operation terminal 10 into contact with the object again and perform the process illustrated in FIG. 8 again.

The exemplary flow of the process at the time of function execution has been described above. Note that the function execution process illustrated in FIG. 8 is an example, and the present disclosure is not limited thereto. For example, the image selection processing indicated in step S224 may be performed by the operation terminal 10. In this case, the processing indicated in step S221 is not performed, and processing of transmitting the selected captured image to the information processing device 20 is performed after the image selection processing. With this arrangement, it becomes possible to reduce the time required for the image transfer to the information processing device 20. Furthermore, the feedback indicated in step S239 may be performed by blinking or sound instead of the vibration.

As described above, according to the present embodiment, it becomes possible to perform operation of the IoT device 30 and the like by a natural action, such as bringing the operation terminal 10 into contact with a nearby object. The botheration related to the operation such as unlocking the smartphone and invoking the operation application every time the operation is performed as described above may be released.

Various objects to which functions are assigned are conceivable. In particular, by registering an object associated with the device to be controlled (IoT device 30) or an object existing nearby, it becomes possible to operate the device with a more natural action. For example, if a bed sheet or a headboard of the bed is registered, it becomes possible to turn on/off lighting of a bedroom by touching the sheet or the headboard. Furthermore, if a sofa is registered and the sofa is touched by a hand, television is turned on. Furthermore, if a desk is registered and the desk is touched, attendance is registered. Furthermore, if a living room wall is registered, it becomes possible to turn on lighting of the living room by touching the wall.

<<4. Variations>>

Next, variations of the present embodiment will be described.

In the operation terminal 10 according to the present embodiment, the stiffness of the return spring 136 may be adjusted depending on the user. For example, since a child or an elderly person is less powerful, the stiffness (strength) of the return spring 136 may be manually adjusted in advance such that a predetermined pushing speed is set (to be pushed by even a weak force). Note that, from the viewpoint of authentication accuracy, the pushing speed is preferably slower. That is, with the slower pushing speed, a larger number of captured images may be obtained (erroneous authentication rate is lowered). Furthermore, blurring may be expected to be suppressed as the pushing speed is slower. The predetermined pushing speed may be, for example, a speed that can secure a time during which at least the set number of times of imaging may be carried out. Furthermore, a table indicating a correspondence relationship between the pushing speed (strength of the return spring 136) described above and the erroneous authentication rate may be prepared in advance and may be displayed on the display unit 240 of the information processing device 20.

Furthermore, the feedback at the time of the end of the pushing (at the time of being pushed to the end) may be performed by light or sound, for example, not limited to the vibration. The operation terminal 10 may be provided with a light emission unit or an audio output unit in place of or in addition to the vibration unit 140.

Furthermore, the lens 132 may be a microlens array. With this arrangement, the lens 132 may be made thinner.

Furthermore, while it has been described that the feedback is performed by vibration when the authentication fails (see step S239) in the embodiment above, the feedback may be performed by vibration also at the time of authentication (when the collation by the collation unit 223 succeeds). Furthermore, a vibration pattern at the time of authentication in the operation terminal 10 may be set for each registered function. With this arrangement, the user is enabled to grasp which function has been invoked. Note that the feedback of the authentication propriety may be performed by light or sound, not limited to the vibration.

Furthermore, a plurality of functions may be assigned to one object (place). With this arrangement, a plurality of IoT devices 30 may be simultaneously operated by one action.

Furthermore, the information processing device 20 may recognize an action using the operation terminal 10 on the basis of a captured image, and may implement the function corresponding to the action. That is, the user registers, as registration information, what kind of function is to be implemented in a case where what kind of action is made at which place. For example, in a case where the user successively touches the same object twice using the operation terminal 10 (within a predetermined time), the information processing device 20 may recognize the double tap and execute a function different from that in the case where the same object is touched once. Furthermore, in a case where separation from the object may be detected in the operation terminal 10, the information processing device 20 may recognize a long press in a case where the contact time is longer than a predetermined time, and may implement the function corresponding to the long press. The separation from the object may be detected by a detection unit provided in the return spring 136. Alternatively, a state in which the distance between the lens and the imaging element 131 is the shortest distance (h_min) may be detected by a ranging sensor or the like, and a long press may be recognized in a case where such a state is continued for equal to or longer than a predetermined time. The operation terminal 10 may recognize the action.

Furthermore, in the present embodiment, it is also possible to recognize a rotational action or an action in the vertical and horizontal directions. With this arrangement, for example, it becomes possible to implement a switch required to detect a twisting operation or an operation amount, such as a dimmer switch, a volume adjustment switch, a temperature setting switch, and the like. Specifically, the operation terminal 10 may be provided with a motion sensor (acceleration sensor, gyroscope sensor, etc. or inertial measurement unit (IMU)), and the twisting operation and the movement in the x/y-axis direction in the state where the operation terminal 10 is pushed may be detected. The operation terminal 10 performs control to transmit multiple captured images and detection data of the motion sensor to the information processing device 20.

Furthermore, the operation terminal 10 may perform control to obtain multiple captured images at a time of moving away from the object 40 as well. Specifically, when the main body 160 of the operation terminal 10 moves away from the object 40, the control unit 120 of the operation terminal 10 performs control to perform imaging multiple times while the movable member 134 is pushed back by the force of the return spring 136. With this arrangement, it becomes possible to obtain multiple captured images each having a different distance h between the lens 132 and the imaging element 131 not only when the operation terminal 10 is brought into contact with but also when the operation terminal is separated. When the movable member 134 starts to be pushed back, the control unit 120 turns on the light source unit 135, and starts the imaging by the imaging unit 130. The start of pushing-back of the movable member 134 may be detected by, for example, a detection unit provided in the return spring 136, a ranging sensor that measures a distance between the lens 132 and the imaging element 131, or the like. The control unit 120 of the operation terminal 10 transmits, to the information processing device 20, multiple captured images obtained at the time of contact and multiple captured images obtained at the time of separation. The information processing device 20 may determine whether or not there is any action in the contact state by comparing the focused image selected from the multiple captured images at the time of contact with the focused image selected from the multiple captured images at the time of separation. Specifically, it may be determined on the basis of deviation or presence/absence of feature points extracted from the focused image. With this arrangement, the information processing device 1 is enabled to invoke a first function (e.g., determination operation) in a case where there is no action and to invoke a second function (e.g., scroll operation) in a case where there is an action.

Furthermore, the imaging element 131 according to the present embodiment is not limited to the imaging element that senses a visible light region, and an imaging element that senses a non-visible light region may be used. For example, it may be an imaging element that senses a short wavelength region or an infrared region. Furthermore, both imaging of the visible light region and imaging of the non-visible light region may be carried out. In a case where a feature that cannot be captured by visible light is successfully extracted from an ultra-narrow region of the object surface using the imaging element that senses the non-visible light region, the authentication accuracy may be further improved.

Furthermore, while it has been described in the embodiment above that the processes of image selection, collation, and function execution are performed by the information processing device 20, the present disclosure is not limited thereto, and the processes of image selection, collation, and function execution may be performed by the control unit 120 of the operation terminal 10. In this case, the operation terminal 10 is communicably connected to the IoT device 30, and transmits a control signal instructing function execution.

Furthermore, the operation terminal 10 according to the present embodiment may be implemented by a smartphone or a wearable device (smartwatch, smart band, etc.). For example, the imaging unit 130 having a structure as illustrated in FIG. 3 is provided in a smartphone or a wearable device. Furthermore, the imaging unit 130 may also be used as an imaging unit for fingerprint authentication. The imaging unit 130 may be used for fingerprint authentication as a first application, and may be used for device operation as a second application.

<<5. Supplement>>

As described above, the operation terminal 10 according to the embodiment of the present disclosure may enhance the convenience of user operation.

While the preferred embodiment of the present disclosure has been described above in detail with reference to the accompanying drawings, the present technology is not limited to such examples. It is obvious that those with ordinary skill in the technical field of the present disclosure may conceive various modifications or corrections within the scope of the technical idea recited in claims, and it is naturally understood that they also fall within the technical scope of the present disclosure.

For example, the structure of the imaging unit 130 according to the present embodiment is not limited to the example illustrated in FIG. 3. The imaging unit 130 according to the present embodiment is only required to have a structure in which the distance h between the lens 132 and the imaging element 131 varies using the force at the time of object contact.

Furthermore, although the IoT device has been used as a device to be operated by the operation terminal 10, the present disclosure is not limited thereto, and various devices may be operated.

Furthermore, it is also possible to create one or more computer programs for causing hardware such as the CPU, the ROM, the RAM, and the like incorporated in the operation terminal 10 or the information processing device 20 described above to implement the functions of the operation terminal 10 or the information processing device 20. Furthermore, a computer-readable storage medium that stores the one or more computer programs is also provided.

Furthermore, the effects described in the present specification are merely exemplary or illustrative, and are not restrictive. That is, the technology according to the present disclosure may exert other effects apparent to those skilled in the art from the description of the present specification in addition to or instead of the effects described above.

Note that the present technology may also have the following configurations.

(1)

An information processing terminal including:

an imaging unit that images an object in contact with or in proximity to a translucent member via the translucent member;

a control unit that controls imaging by the imaging unit; and a communication unit that transmits information based on a captured image obtained by the imaging unit to an external device, in which the imaging unit includes an imaging element and a lens provided such that a distance from the imaging element varies, and the control unit performs control to obtain a plurality of the captured images having a different distance between the lens and the imaging element.

(2)

The information processing terminal according to (1) described above, in which the translucent member and the lens are fixed to a movable member that is pushed in a direction toward the imaging element by contact with the object.

(3)

The information processing terminal according to (2) described above, in which the translucent member is positioned at a distal end of the movable member and on a side opposite to the imaging element with respect to the lens, and is disposed to cover the lens.

(4)

The information processing terminal according to (3) described above, in which the translucent member is a light guide plate, and a light source unit is provided around the light guide plate.

(5)

The information processing terminal according to (4) described above, in which the control unit performs control to turn on the light source unit and start the imaging by the imaging unit when pushing of the movable member is detected.

(6)

The information processing terminal according to (5) described above, in which the control unit performs the control to turn on the light source unit and start the imaging by the imaging unit also when pushing-back of the movable member is detected.

(7)

The information processing terminal according to any one of (1) to (6) described above, in which the information processing terminal is a wearable device.

(8)

The information processing terminal according to (7) described above, in which the information processing terminal has a ring-shaped main body that may be worn on a finger.

(9)

The information processing terminal according to (7) or (8) described above, in which the control unit performs control to transmit, to the external device, the plurality of captured images having a different distance between the lens and the imaging element, and the external device is an information processing device that performs control to execute a corresponding pre-registered function on the basis of a captured image selected from the plurality of captured images.

(10)

The information processing terminal according to (7) or (8) described above, in which the control unit performs control to select a captured image in focus from the plurality of captured images having a different distance between the lens and the imaging element, and to transmit the selected captured image to the external device.

(11)

An information processing device including:

a control unit that performs control to transmit, to a device via a communication unit, a control signal that instructs execution of one or more corresponding pre-registered functions on the basis of a captured image selected from a plurality of captured images obtained by imaging an object in contact with or in proximity to an imaging unit.

(12)

The information processing device according to (11) described above, in which the control unit analyzes the selected captured image to obtain a feature amount, and performs control to execute a function associated with a registered feature amount that matches the feature amount.

(13)

The information processing device according to (11) or (12) described above, in which the control unit selects the captured image in focus from the plurality of captured images.

(14)

The information processing device according to any one of (11) to (13) described above, in which the control unit recognizes an action from analysis of the selected captured image or from motion sensor data, and performs control to execute a function corresponding to the action.

(15)

The information processing device according to any one of (11) to (14) described above, in which the plurality of captured images is a plurality of captured images having a different distance between a lens and an imaging element included in the imaging unit.

(16)

The information processing device according to (15) described above, in which the control unit receives the plurality of captured images from an operation terminal that includes the imaging unit and performs control to obtain the plurality of captured images having a different distance between the lens and the imaging element.

(17)

The information processing device according to (15) described above, in which the control unit receives the captured image selected from the plurality of captured images from an operation terminal that includes the imaging unit and performs control to obtain the plurality of captured images having a different distance between the lens and the imaging element.

(18)

The information processing device according to (15) described above, further including:

the imaging unit, in which the control unit performs control to obtain the plurality of captured images having a different distance between the lens and the imaging element.

(19)

A system including:

an information processing terminal; and an information processing device, in which the information processing terminal includes:

an imaging unit that images an object in contact with or in proximity to a translucent member via the translucent member;

a control unit that controls imaging by the imaging unit; and a communication unit that transmits information based on a captured image obtained by the imaging unit to the information processing device, the imaging unit includes an imaging element and a lens provided such that a distance from the imaging element varies, the control unit performs control to obtain a plurality of the captured images having a different distance between the lens and the imaging element, and the information processing device includes:

a control unit that performs control to transmit, to a device via a communication unit, a control signal that instructs execution of one or more corresponding pre-registered functions on the basis of a captured image selected from the plurality of captured images captured by the imaging unit.

REFERENCE SIGNS LIST

10 Operator terminal
110 Communication unit
120 Control unit
130 Imaging unit
   131 Imaging element
   132 Lens
   133 Light guide plate
   134 Movable member
   135 Light source unit
   136 (1362, 136b) Return spring
140 Vibration unit
150 Storage unit
20 Information processing device
210 Communication unit
220 Imaging unit
   221 Registration processing unit
   220 Image selection unit
   223 Collation unit
   224 Function execution unit
230 Operation input unit
240 Display unit
250 Storage unit

The invention claimed is:

1. An information processing terminal comprising:

an imaging unit configured to image an object in contact with or in proximity to a translucent member via the translucent member; and circuitry configured to control imaging by the imaging unit, and transmit information, based on at least one captured image among a plurality of captured images obtained by the imaging unit, to an external device, wherein the imaging unit includes an imaging element and a lens provided such that a distance from the imaging element varies according to movement of a movable member to which the translucent member and the lens are fixed, wherein the circuitry performs control to obtain the plurality of captured images, each captured image having a different distance between the lens and the imaging element, and wherein the circuitry performs the control to start obtaining the plurality of captured images when the movement of the movable member is detected.

2. The information processing terminal according to claim 1, wherein the movable member is configured to be pushed in a direction toward the imaging element by contact with the object.

3. The information processing terminal according to claim 2, wherein the translucent member is positioned at a distal end of the movable member and on a side opposite to the imaging element with respect to the lens, and wherein the translucent member is disposed to cover the lens.

4. The information processing terminal according to claim 3, wherein the translucent member includes a light guide plate, and wherein a light source is provided around the light guide plate.

5. The information processing terminal according to claim 4, wherein the circuitry performs control to turn on the light source and start the imaging by the imaging unit when pushing of the movable member in the direction toward the imaging element is detected.

6. The information processing terminal according to claim 5, wherein the circuitry performs the control to turn off the light source and end the imaging by the imaging unit when pushing-back of the movable member in a direction away from the imaging element is detected.

7. The information processing terminal according to claim 1, wherein the information processing terminal includes a wearable device.

8. The information processing terminal according to claim 7, wherein the information processing terminal has a ring-shaped main body that is configured to be worn on a finger.

9. The information processing terminal according to claim 7, wherein the circuitry performs control to transmit, to the external device, the plurality of captured images, and wherein the external device includes an information processing device that is configured to perform control to execute a corresponding pre-registered function based on a selected captured image selected from the plurality of captured images.

10. The information processing terminal according to claim 7, wherein the circuitry performs control to select each captured image in focus from the plurality of captured images as the at least one captured image to be transmitted to the external device.

11. An information processing device comprising:

circuitry configured to select at least one captured image among a plurality of captured obtained by an imaging unit, and transmit, to a device, a control signal that instructs execution of one or more corresponding pre-registered functions based on the at least one captured image selected from the plurality of captured images obtained by imaging an object in contact with or in proximity to the imaging unit, wherein the imaging unit is controlled to obtain the plurality of captured images, each captured image having a different distance between a lens and an imaging element of the imaging unit according to movement of the lens, and wherein the imaging unit is controlled to start obtaining the plurality of captured images when the movement of the lens is detected.

12. The information processing device according to claim 11, wherein the circuitry is further configured to analyze the at least one selected captured image to obtain a feature amount, and perform control to execute a function associated with a registered feature amount that matches the feature amount.

13. The information processing device according to claim 11, wherein the circuitry selects the at least one captured image in focus from the plurality of captured images.

14. The information processing device according to claim 11, wherein the circuitry is further configured to recognize an action from analysis of the at least one selected captured image or from motion sensor data, and perform control to execute a function corresponding to the recognized action.

15. The information processing device according to claim 11, wherein the plurality of captured images includes a plurality of captured images having different distances from a longest distance to a shortest distance between the lens and the imaging element included in the imaging unit.

16. The information processing device according to claim 15, wherein the circuitry is further configured to receive the plurality of captured images from an operation terminal that includes the imaging unit, and perform control to obtain the plurality of captured images having the different distances between the lens and the imaging element.

17. The information processing device according to claim 15, wherein the circuitry is further configured to receive the at least one captured image selected from the plurality of captured images from an operation terminal that includes the imaging unit, and perform control to obtain the plurality of captured images having the different distance between the lens and the imaging element.

18. The information processing device according to claim 15, further comprising:

the imaging unit, wherein the circuitry is further configured to perform control to obtain the plurality of captured images having the different distances between the lens and the imaging element.

19. A system comprising:

an information processing terminal; and an information processing device, wherein the information processing terminal includes:

an imaging unit configured to image an object in contact with or in proximity to a translucent member via the translucent member; and circuitry configured to control imaging by the imaging unit; and transmit information, based on at least one captured image among a plurality of captured images obtained by the imaging unit, to the information processing device, wherein the imaging unit includes an imaging element and a lens provided such that a distance from the imaging element varies according to movement of a movable member to which the translucent member and the lens are fixed, wherein the circuitry performs control to obtain the plurality of captured images, each captured image having a different distance between the lens and the imaging element, wherein the circuitry performs the control to start obtaining the plurality of captured images when the movement of the movable member is detected, and wherein the information processing device includes:

circuitry configured to select at least one captured image among the plurality of captured obtained by the imaging unit transmit, to a device, a control signal that instructs execution of one or more corresponding pre-registered functions based on the at least one captured image selected from the plurality of captured images captured by the imaging unit.

\* \* \* \* \*